June 6, 1967  T. E. SCHNEIDER, JR., ET AL  3,323,541
SAFETY DEVICE FOR GAS CYLINDERS Filed April 3, 1963  2 Sheets-Sheet 1

INVENTORS
THOMAS E. SCHNEIDER, JR.
JOHN W. GIRVAN
BY GUY T. JONES

Newton, Hopkins & Jones
ATTORNEYS

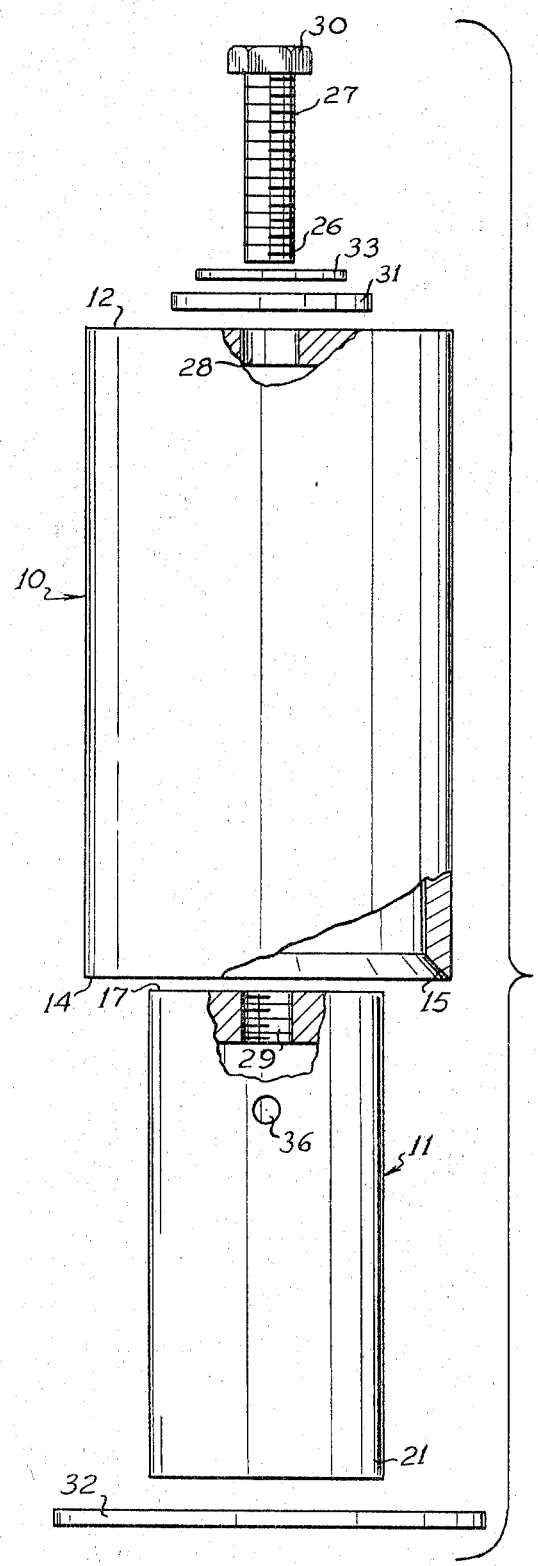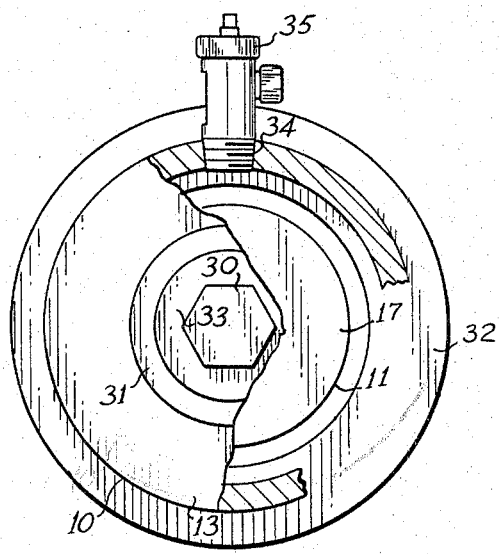

United States Patent Office 3,323,541
Patented June 6, 1967

3,323,541
SAFETY DEVICE FOR GAS CYLINDERS
Thomas E. Schneider, Jr., Guy T. Jones, and John W. Girvan, Atlanta, Ga., assignors to Tesco Chemical, Inc., Atlanta, Ga., a corporation of Georgia
Filed Apr. 3, 1963, Ser. No. 270,347
4 Claims. (Cl. 137—312)

This invention relates to safety devices, and more particularly to a safety device to prevent and control the release of a gas, such as chlorine, from a storage cylinder having a leaking valve or a leak in that portion of the cylinder structure adjacent to the cap plate into which the valve is inserted.

Gases such as chlorine are customarily shipped and stored prior to use in cylindrical tanks. These tanks have a gas release valve at their top through which the gas is pumped to fill the tank, and through which the gas is permitted to escape when it is desired to use the gas. A cap is generally provided to protect the valve from damage when the tank is shipped, stored or otherwise not in use. This cap completely covers the valve and is seated on the tank over the valve by twisting its threaded lower inner edge onto the threaded nub of a cap plate which is attached to the tank with its threaded nub surrounding and concentric with the base of the valve.

The cap is intended only to protect the valve from physical damage and will not prevent the escape of gas from the cylindrical tank. A gas leak due to a faulty valve mechanism can be checked by connecting the valve to a pipe, hose or other fitting having a supplemental valve or other means for controlling gas flow associated with it. However, there will be at least a temporary escape of gas until the connection is made and such fittings provide no control over the escape of gas from a cylindrical tank when the gas leak is due to a faulty valve structure, such as a rupture in the wall of the valve or when the gas leak is in the cap plate or the joint between the cap plate and the cylindrical tank.

This invention solves these problems associated with valve leaks and leaks in the area of the cap plate in general. It will completely check a valve leak whether in the valve mechanism or valve structure, and also those leaks at and adjacent to the cap plate. In addition, it permits the gas in the cylindrical tank to be conveniently and safely withdrawn from the tank after the leak has been stopped.

These advantages and improvements in safety devices are accomplished by a cylindrical sealing chamber which completely surrounds the valve and cap plate of a gas cylinder so as to provide a gas-tight compartment from which gas may not escape. The sealing chamber is conveniently and quickly positioned using an anchor cylinder which seats on the nub of the cap plate in place of the customary cap. The sealing chamber has an exit port into which a valve is inserted so that the escaping gas may be withdrawn safely.

These and other features and advantages of the invention will be more clearly understood from the following detailed description and the accompanying drawings in which like characters of reference designate corresponding parts in all figures, and in which:

FIG. 2 is a side elevational view of the safety device with its components disassembled and vertically arranged one above the other for clarity.

FIG. 3 is a top plan view of the assembled safety device, but with a partial section taken in a plane parallel to and below the top plate of the sealing chamber.

Figure 1:
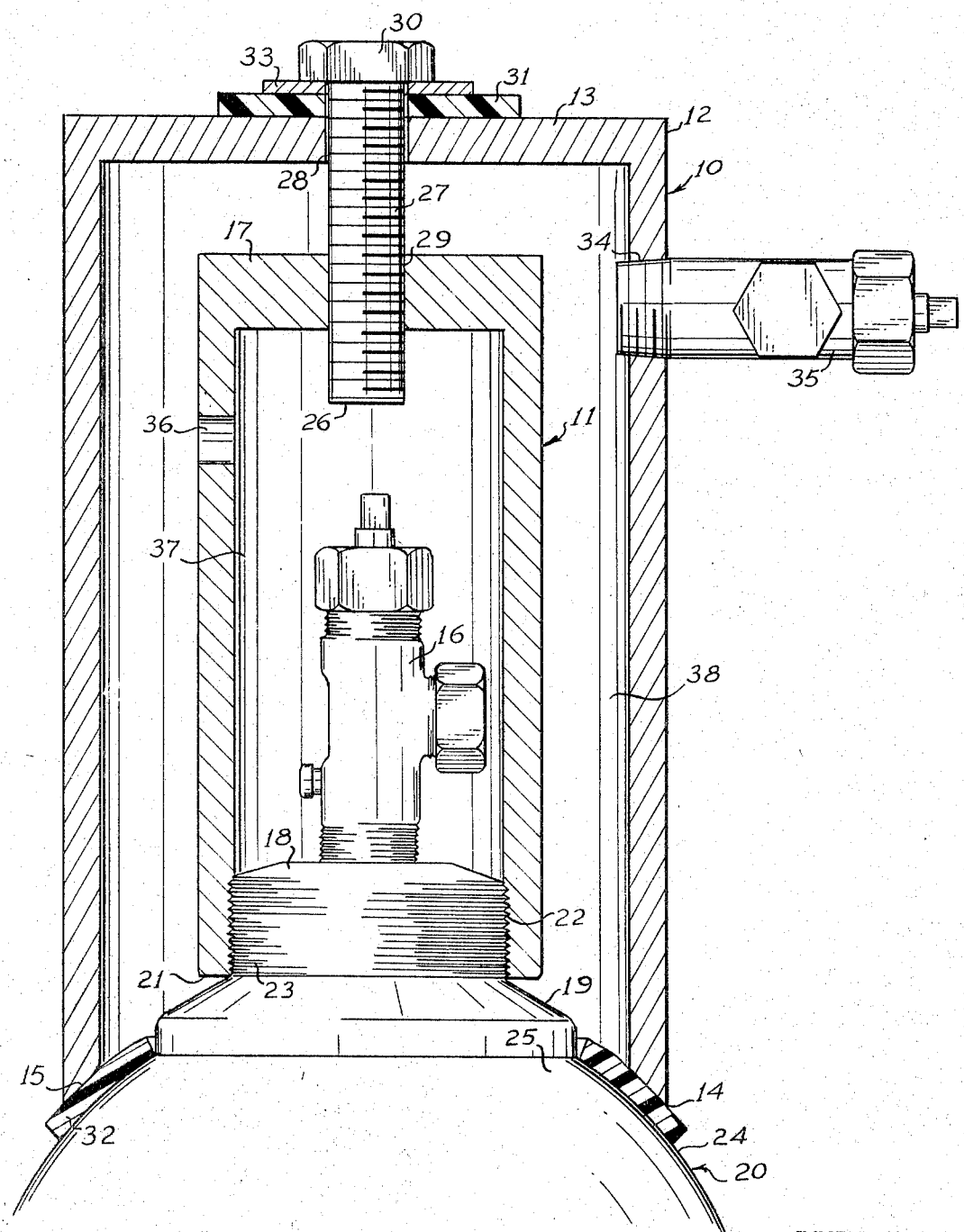
FIG. 1 is a sectional view of the safety device taken in the center line of the sealing chamber and showing the safety device mounted on the top of a gas cylinder shown in side elevation.

These drawings and the following detailed description disclose a preferred specific embodiment of the invention, but the invention is not limited to the details disclosed since it may be embodied in other equivalent forms.

This invention is most easily understood by considering it to be comprised of a sealing chamber 10 and an anchor cylinder 11. The sealing chamber 10 is a hollow cylindrical tube closed at one end 12 by a top plate 13. At its open end 14, the circular edge 15 of the sealing chamber 10 is beveled so that it slants toward the top plate 13 and the center line of the sealing chamber 10.

The anchor cylinder 11 is a hollow cylindrical tube closed at one end by an anchor plate 17. The inside diameter of the anchor cylinder 11 is the same as the threaded outside diameter of the nub 18 of the cap plate 19 attached to a gas cylinder 20, and its inside length is greater than the length of nub 18 and the valve 16 extending above the nub 18. At the open end 21 of the anchor cylinder 11 the inside surface of anchor cylinder 11 has threads 22.

These threads 22 and the inside diameter and length of the anchor cylinder 11 are selected to permit the open end 21 of the anchor cylinder 11 to be placed over the valve 16, and the anchor cylinder 11 twisted into position on the nub 18 of the cap plate 19 with its threads 22 engaging the threads 23 of the nub 18. Thus, the anchor cylinder 11 is seated on a gas cylinder 20 in the same manner and using the same threaded nub 18 as the cap which is customarily used on a gas cylinder 20 to protect the valve 16 in shipping and storing. The invention is usable on any gas cylinder 20 having provision for the usual cap.

The inside diameter and length of the sealing chamber 10 is greater than the outside diameter and length of the anchor cylinder 11 and permits the sealing chamber 10 to be placed over and around anchor cylinder 11 positioned on the dome-shaped top 25 of a gas cylinder 20. The inside diameter of the sealing chamber 10 is sufficiently large and the slope of the bevel of its circular edge 15 is such that when the sealing chamber 10 is placed over the anchor cylinder 11, the circular edge 15 will engage and generally follow the surface of the dome-shaped top 25 of the gas cylinder 20 along a circle concentric with, but larger than, the cap plate 19. As a result, the sealing chamber 10 will completely enclose the anchor cylinder 10 with the valve 16 and nub 18 within it, the cap plate 19, and the joint between the cap plate 19 and the surface 24 of the top 25 of the gas cylinder 20.

The sealing chamber 10 is held in position over the anchor cylinder 11 and with its circular edge 15 engaging the surface 24 of the top 25 of the gas cylinder 20 by inserting the threaded end 26 of a bolt 27 through a channel 28 in the top plate 13 of the sealing chamber 10 and into a threaded hole 29 in the anchor plate 17 of the anchor cylinder 11. The bolt 27 has a head 30, and rotation of the threaded end 26 of the bolt 27 in the hole 29 will cause the head 30 to move toward or away from the anchor plate 17 of the anchor cylinder 11 in the understood manner.

The head 30 of the bolt 27 will not pass through the channel 28 of the sealing chamber 10. As a result, when the head 30 of the bolt 27 is moved toward the anchor plate 17 with rotation of the bolt 27, the anchor plate 17 and the top plate 13 of the sealing chamber 10 are drawn closer together. Since the position of the anchor plate 17 with reference to the gas cylinder 20 is fixed because of the fixed position of the anchor cylinder 11 on the nub 18 of the cap plate 19, this relative motion of the anchor plate 17 and the top plate 13 will draw the sealing chamber 10 toward the dome-shaped top 25 of the gas cylinder 20, so that the circular edge 15 of the sealing chamber 10 firmly engages the gas cylinder 20. Thus, the sealing chamber 10 will completely enclose the valve 16 and cap plate 19, and any valve 16 leaks or leaks in the vicinity of the valve 16 and cap plate 19 will be into the interior of the sealing chamber.

A pliable washer 31 and an O-ring 32 of neoprene or some other known pliable material resistant to the action of chlorine or similar gases are used to insure that leaking gas will not escape from the interior of the sealing chamber 10. The O-ring 32 is placed and squeezed between the circular edge 15 of the sealing chamber 10 and the surface 24 of the dome-shaped top 25 of the gas cylinder 20 and provides a gas-tight seal where the sealing chamber engages the gas cylinder 20.

The pliable washer 31 and a metal washer 33 are placed on the bolt 27 between the top plate 13 and the head 30 of the bolt 27 when the bolt 27 is inserted through the channel 28. The pliable washer 31 is between the metal washer 33 and the top plate 13 and is squeezed between the metal washer 33 of the top plate 13 of the sealing chamber 10 as rotation of the bolt 27 draws the sealing chamber 10 down into position on the gas cylinder 20. The squeezing of the pliable washer 31 causes it to spread and tightly surround the bolt 27 and close the gap between the bolt 27 and the side of the channel 28.

When positioned in a gas cylinder 20, the sealing chamber 10 prevents gas leaks from a valve 16, a fusible plug, or tank structure adjacent to a valve 16 by completely sealing within its interior all of the escaping gas. The invention is equally suitable for controlling leaks from any of these gas cylinder 20 locations or fittings. Gas will continue to escape only until the pressure within the sealing chamber 10 equals that within the gas cylinder 20.

In order that the gas in the gas cylinder 20 may be withdrawn after the leak is checked, the sealing chamber 10 is provided with a valve hole 34 into which a gas relief valve 35 of known type is inserted. The gas may be withdrawn from the gas cylinder 20 through the valve 35 since the withdrawal of gas from the sealing chamber 10 will result in additional gas flowing through the point of leakage from the gas cylinder 20 into the sealing chamber until the gas cylinder is empty.

The anchor cylinder 11 is provided with a passage hole 36 joining its interior 37 to the surrounding interior 38 of the sealing chamber 10. This passage hole 36 prevents the anchor cylinder 11 from acting as a barrier between a leak in the valve 16 within the anchor cylinder 11 and the valve 35 by which the escaping gas is withdrawn for use. Thus, the invention not only checks all leaks in the area of the valve 16, but it also insures that regardless of the location of the leak in this area, the gas can be withdrawn safely.

What is claimed as invention is:

1. A safety device for a gas cylinder of the type providing an externally threaded nub supporting a gas discharge valve and a surrounding area beyond said nub, including, an internal anchor chamber, internal threads formed on said anchor chamber for threadedly engaging the external threads of said nub to secure said anchor chamber to said nub, an external sealing chamber enclosing said internal anchor chamber, said external sealing chamber defining an open end edge sealingly engageable in abutting relationship with said surrounding area of said cylinder beyond said nub, and a threadedly adjustable interconnection between said internal anchor chamber and said external sealing chamber operable to adjust the location of said external sealing chamber with respect to said internal anchor chamber to force said open end edge of said external sealing chamber in sealing engagement with said surrounding area of said cylinder beyond said nub.

2. The safety device as set forth in claim 1 in which said threadedly adjustable interconnection between said internal anchor chamber and said external sealing chamber is defined by an externally threaded bolt freely rotatable through said external sealing chamber and threadedly engaged by said internal anchor chamber.

3. The safety device as set forth in claim 2 in which the bolt includes a head externally of said sealing chamber whereby axial movements of said bolt in response to rotation and the threaded engagement with said anchor chamber will induce a corresponding axial movement of said sealing chamber to seal its open end against said surrounding cylinder surface.

4. The safety device as set forth in claim 1 for use with the gas cylinder as defined, wherein the surrounding cylinder surface is curved away from said externally threaded nub, and in which the open end edge of said sealing chamber is beveled to conform with the curvature of said surrounding cylinder surface.

References Cited

UNITED STATES PATENTS

| | | | |
|---|---|---|---|
| 1,413,502 | 4/1922 | Steinmetz | 137—382 X |
| 1,606,715 | 11/1926 | Miller | 137—312 |
| 2,110,124 | 3/1938 | Fitz Gerald | 220—55 X |
| 2,294,261 | 8/1942 | Wilkinson | 220—55 |
| 2,465,095 | 3/1949 | Harvey | 220—85 X |

WILLIAM F. O'DEA, *Primary Examiner.*

ISADOR WEIL, *Examiner.*

R. GERARD, *Assistant Examiner.*